(12) United States Patent
Brenhouse

(10) Patent No.: US 7,672,871 B2
(45) Date of Patent: Mar. 2, 2010

(54) SELF-CHECKOUT SYSTEM WITH ANTI-THEFT DEACTIVATION DEVICE

(75) Inventor: Elliot Brenhouse, Cote St. Luc (CA)

(73) Assignee: Fujitsu Frontech North America Inc., Richardson, TX (US)

( * ) Notice: Subject to any disclaimer, the term of this patent is extended or adjusted under 35 U.S.C. 154(b) by 1336 days.

(21) Appl. No.: 10/086,661

(22) Filed: Feb. 28, 2002

(65) Prior Publication Data

US 2002/0123932 A1      Sep. 5, 2002

Related U.S. Application Data

(60) Provisional application No. 60/272,133, filed on Feb. 28, 2001.

(51) Int. Cl.
*G06Q 20/00* (2006.01)
(52) U.S. Cl. .................. 705/16; 364/403; 340/568; 340/572; 186/61; 705/17; 235/383; 235/462
(58) Field of Classification Search .................. 705/16, 705/22, 23; 235/383
See application file for complete search history.

(56) References Cited

U.S. PATENT DOCUMENTS

| | | | | |
|---|---|---|---|---|
| 4,881,061 A | * | 11/1989 | Chambers ................. 340/572.1 |
| 5,005,125 A | * | 4/1991 | Farrar et al. .................... 705/28 |
| 5,115,888 A | * | 5/1992 | Schneider ..................... 186/61 |
| 5,140,141 A | | 8/1992 | Inagaki et al. ................ 235/462 |
| 5,151,684 A | * | 9/1992 | Johnsen ..................... 340/568.1 |
| 5,594,228 A | * | 1/1997 | Swartz et al. ................ 235/383 |
| 5,814,799 A | * | 9/1998 | Swartz et al. ................ 235/383 |
| 5,979,758 A | * | 11/1999 | Swartz et al. ................ 235/383 |
| 6,102,290 A | * | 8/2000 | Swartz et al. ............ 235/462.01 |
| 6,167,381 A | * | 12/2000 | Swaine et al. ................. 705/17 |
| 6,169,483 B1 | * | 1/2001 | Ghaffari et al. ........... 340/572.3 |
| 6,497,361 B1 | * | 12/2002 | Mason ........................ 235/383 |
| 6,719,202 B1 | * | 4/2004 | Kawai et al. ................... 705/28 |
| 2002/0011933 A1 | * | 1/2002 | Andersen et al. ......... 340/572.1 |

FOREIGN PATENT DOCUMENTS

| | | |
|---|---|---|
| EP | 0 327 514 | 2/1989 |
| EP | 0 905 658 | 8/1998 |
| GB | 2 161 631 | 7/1985 |
| WO | WO 99/53435 | 3/1999 |

OTHER PUBLICATIONS http://www.sourcesecurity.com/markets/retail-and-eas.html.*
Planning Guide from Sensormatic, "ScanMax™ Deactivator Systems", 2000, pp. 1-12.
Int'l Search Report dated Jun. 12, 2003 for PCT/CA02/00248.

* cited by examiner

*Primary Examiner*—Matthew S Gart
*Assistant Examiner*—R. Shay Glass
(74) *Attorney, Agent, or Firm*—Victor Siber; Baker & Hostetler LLP

(57) ABSTRACT

A self-checkout system for processing an article with an security tag attached thereto includes a self-checkout station, a product code input device, a deactivation device and a prompting system to provide instructions to a user. The system can automatically prompt a user to pass an article within a deactivation region generated by the deactivation device to deactivate an anti-theft tag.

13 Claims, 10 Drawing Sheets

SELF-CHECKOUT SYSTEM WITH ANTI-THEFT DEACTIVATION DEVICE

CROSS-REFERENCE(S) TO RELATED APPLICATIONS

This application claims the benefit of the filing date of U.S. provisional application 60/272,133, which was filed on Feb. 28, 2001.

BACKGROUND OF THE INVENTION

In the last several years, self-checkout point-of-sale systems have become popular in retail stores. Typical self-checkout systems include a database of prices, inventory and other information related to items ("articles") for purchase, and one or more self-checkout stations, or terminals. The station may have a number of input and output ("I/O") devices such as a printer, an electronic fund transfer terminal ("EFT"), a video camera unit and a display. In addition, self-checkout stations typically have a bar code reader (which may have an integrated scale), that can scan a machine readable bar code to identify a scanned item. When a bar code is scanned, the scanner (or, reader) sends a signal corresponding to the product number of the item to a data processing component of the system, which then obtains from the database information relating to the item such as price and description.

Automated self-checkout systems, such as the U-Scan Express® line of systems available from Optimal Robotics Corp., enable customers ("users") to scan, bag and pay for their purchases themselves, with limited need for interaction by store personnel. Self-checkout systems have been adopted by supermarket and discount retailers looking to speed up service and cut back on labor costs.

Electronic security systems have also been provided in retail, commercial and industrial marketplaces to prevent or deter unauthorized removal of articles from a controlled area. In some known security systems, such as Ultra•Max®, anti-theft technology available from Sensormatic Electronics Corporation, electromagnetic anti-theft devices (such as markers, tags or labels) are attached to articles to be protected. An electromagnetic field is generated for detecting the anti-theft tags by, for example, a pair of Ultra•Max pedestals located at or near the exits of the controlled area or store. If an anti-theft tag that was not first deactivated is brought into the electromagnetic field, the presence of the tag is detected and the security system may generate an alarm or some other notification.

Options available for authorized removal of an article from a controlled area or store utilizing an electronic security system include: deactivating the tag upon purchase prior to removal, removing the tag from the article after purchase, or passing the tag, with the article, around the electromagnetic field to prevent detection by the security system. Removing the tag without damaging the packaging of the article is usually difficult, because tags often are applied securely to articles at the time of manufacturing or distribution. Passing the article around the detection zone presents problems because the tag remains active and can interact with security systems in other controlled areas, inadvertently activating those systems. Thus, deactivation of the anti-theft tag is the more practical solution.

A reliable system of deactivating electromagnetic anti-theft tags attached to articles for purchase would provide increased security in a self-checkout system.

SUMMARY OF THE INVENTION

The present invention incorporates an anti-theft solution, in which electromagnetic anti-theft tags are attached to articles ("items") for purchase, into a self-checkout system without sacrificing the convenient, reliable and easy to operate features of the self-checkout system. Thus, customers using a self-checkout system are able to deactivate anti-theft labels when a legitimate purchase is self-scanned at the point-of-sale, enabling shoppers to purchase merchandise with little or no assistance from store personnel.

The self-checkout system may include a bar code reader and an anti-theft tag deactivation device ("deactivation pad"). When the bar code on an article for purchase having an anti-theft tag attached thereto is scanned by the bar code reader ("scanner") the customer is prompted (e.g., by an audible and/or visual prompt) to touch the article, and/or bar code or tag, to a target positioned within a predetermined region of deactivation associated with the deactivation device (a "deactivation region"), thereby deactivating the anti-theft tag. In some implementations, the self-checkout system may provide prompts to the user (e.g., to scan an article, to move the article within the deactivation region, or both) before the user initiates activity at the self-checkout station (i.e., scanning an article).

In another implementation, the self-checkout system includes a bar code reader, a deactivation device, a sensor, and a scale. The sensor (such as an acoustic or optical sensor) can be positioned and adjusted to monitor movement of an object within a predetermined region over the deactivation device. The predetermined region of deactivation may correspond to a volume or space above the deactivation device up to a point at which an activated tag cannot be deactivated by the deactivation device. The scale may be incorporated with a bagging platform and/or bag holding device, and configured to sense the weight of items placed on the platform or into a bag. When an article having an anti-theft tag attached thereto is scanned by the bar code reader, the customer is prompted to pass the article within the deactivation region. Once the bar code on an item is scanned, if the sensor does not detect that the article was moved by the user to pass through the deactivation region prior to placement of the item on the scale, the user is again prompted to pass the article over the deactivation device at a suitable height (i.e., within the deactivation region).

In some implementations, when an article correctly passes through the predetermined region over the deactivation device, an indication ("deactivation feedback") that the article was passed correctly (or the tag was successfully deactivated) may be provided to the user. The indication may include a voice/audible and/or graphic/visual prompt.

The present invention may also provide greater efficiency and user friendliness by determining the presence of an anti-theft tag on an article being purchased. By determining whether an article has an anti-theft tag attached, the system can be caused to react more passively toward the purchasing of items that do not have tags attached and more restrictively toward items having tags attached. For example, when purchasing items not having a tag attached, the system may not require the user to pass the article through the predetermined region over the deactivation device, therefore eliminating that step.

The system can be alerted as to the presence of a tag on an article for example, by the inclusion of information in the product lookup database identifying articles having anti-theft tags attached. Once the bar code on an item is scanned by the bar code reader, the lookup database is referenced to determine whether the particular item has a tag attached. Use of this feature as part of the system can lower customer frustration and increase system efficiency because the customer is not required to pass articles identified as not having a tag attached through the predetermined region over the deactivation device.

The system may further include an anti-theft tag detector positioned at a distance away from a bagging area and in a direction toward an exit from the checkout area. This detector is positioned to detect a non-deactivated anti-theft tag moving toward the exit. This arrangement is useful to prevent tags (and the attached articles) that have not been deactivated from being removed from the store. When a detector detects a non-deactivated anti-theft tag, a voice (and/or other audible or visual) prompt or alarm may be provided.

The present invention also provides a method for self-checkout of an article with an electromagnetic anti-theft tag attached thereto. The method, in accordance with an embodiment, comprises providing a deactivation device, a sensor, a bar code reader and a scale, wherein the deactivation device is positioned along the path of movement of the article from the bar code reader to the scale. The sensor is positioned and adjusted to monitor movement of an object within a predetermined region over the deactivation device. An audible or visual prompt may be provided instructing a user to pass the article with the anti-theft tag attached thereto over the deactivation device at a suitable height, after the bar code on the article is scanned by the bar code reader. If the article was not moved by the user to pass through the deactivation region over the deactivation device before placement of the item on the scale (or integrated bagging platform or bag holding device), the user may be prompted with an instruction to pass the last item scanned through the deactivation region.

Other implementations include deactivation devices suitable for use with multimedia items, and devices for the removal of "hard tag" removable security devices from purchased articles.

Retailers desire a self-checkout solution that provides advantages such as: (a) low cost; (b) ease of use; (c) reliable deactivation of anti-theft tags; (d) short learning curve for end user (e.g., customer); and (e) ensuring that present self-checkout stations are upgradable in the field. Implementations of the invention may provide one or more of the forgoing advantages.

BRIEF DESCRIPTION OF THE DRAWINGS

The present invention can be more readily understood from the following detailed description by referring to the accompanying drawings wherein.

DETAILED DESCRIPTION OF THE INVENTION

A self-checkout system can include an anti-theft security tag deactivation subsystem and interactive instructions to assist a user in deactivating anti-theft tags attached to the article for purchase.

Figure 1:
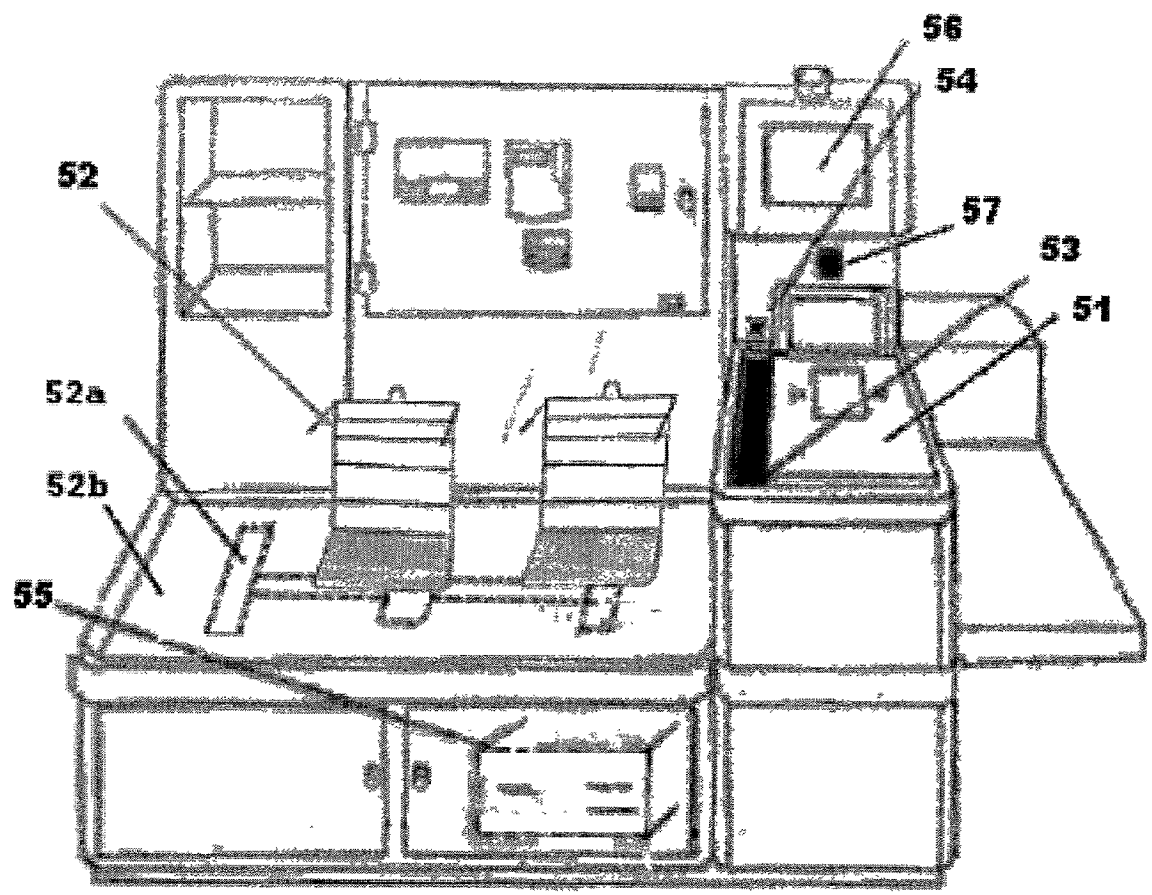
FIG. 1 is a perspective view of a self-checkout system.
Figure 5:
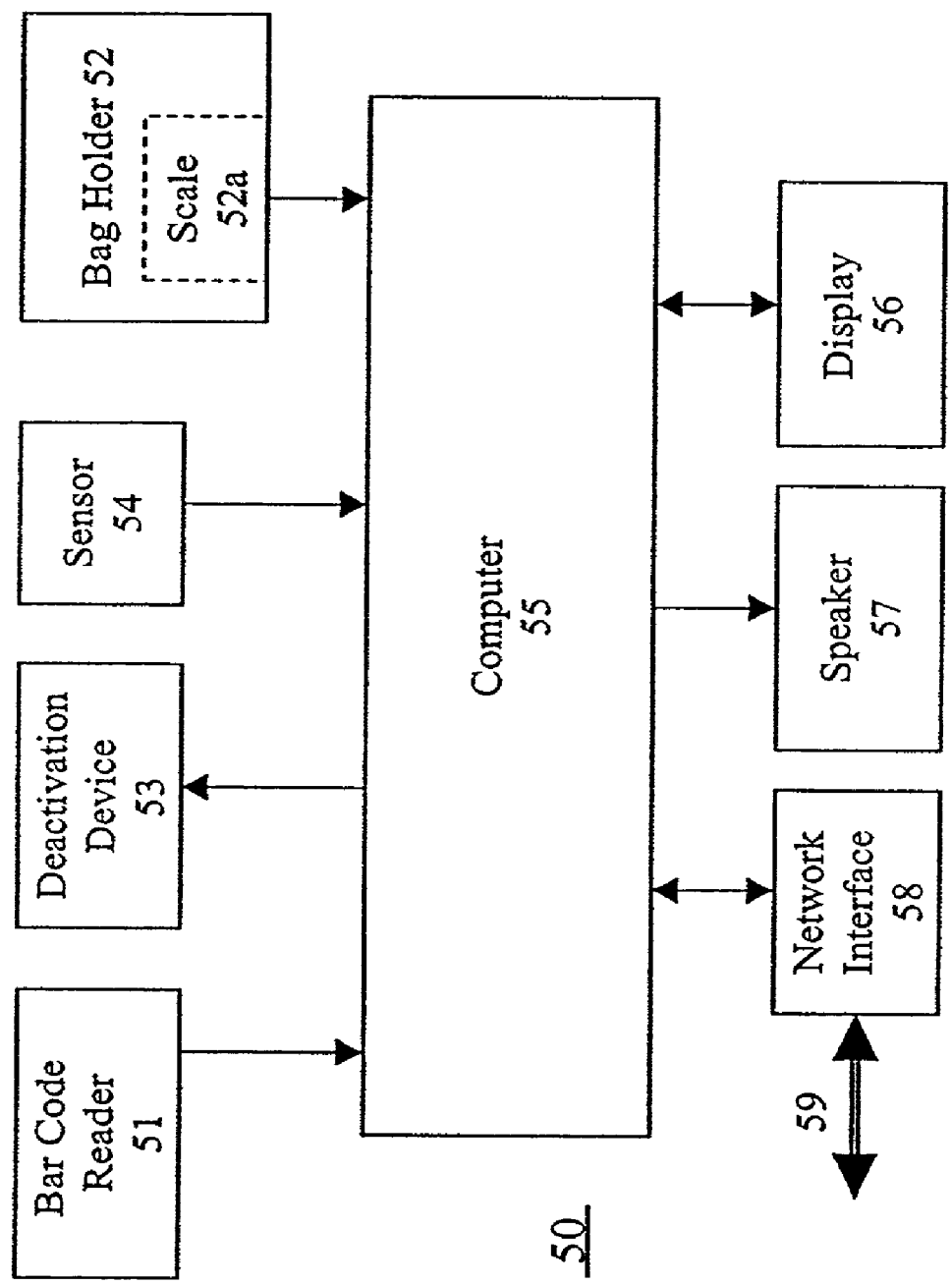
FIG. 5 shows a block diagram of a self-checkout system.

Referring now to the self-checkout system of FIG. 5, a computer 55 controls operations of the self-checkout system 50. The system 50 includes a bar code reader 51 for self-scanning of articles to be purchased, bagging scale 52a and an anti-theft tag deactivation device 53. Bagging scale 52a may integrated into bagging platform 52b (FIG. 1) such that any article placed upon bagging platform 52b after scanning by bar code reader 51, is detected by bagging scale 52a. A bag holding device 52 may also be incorporated into bagging platform 52b. In some implementations, bagging platform 52b, bag holding device 52, and bagging scale 52a may be configured as described in pending U.S. patent application Ser. No. 09/642,716, entitled Apparatus For Self-Serve Checkout Of Large Order Purchases.

Figure 1A:
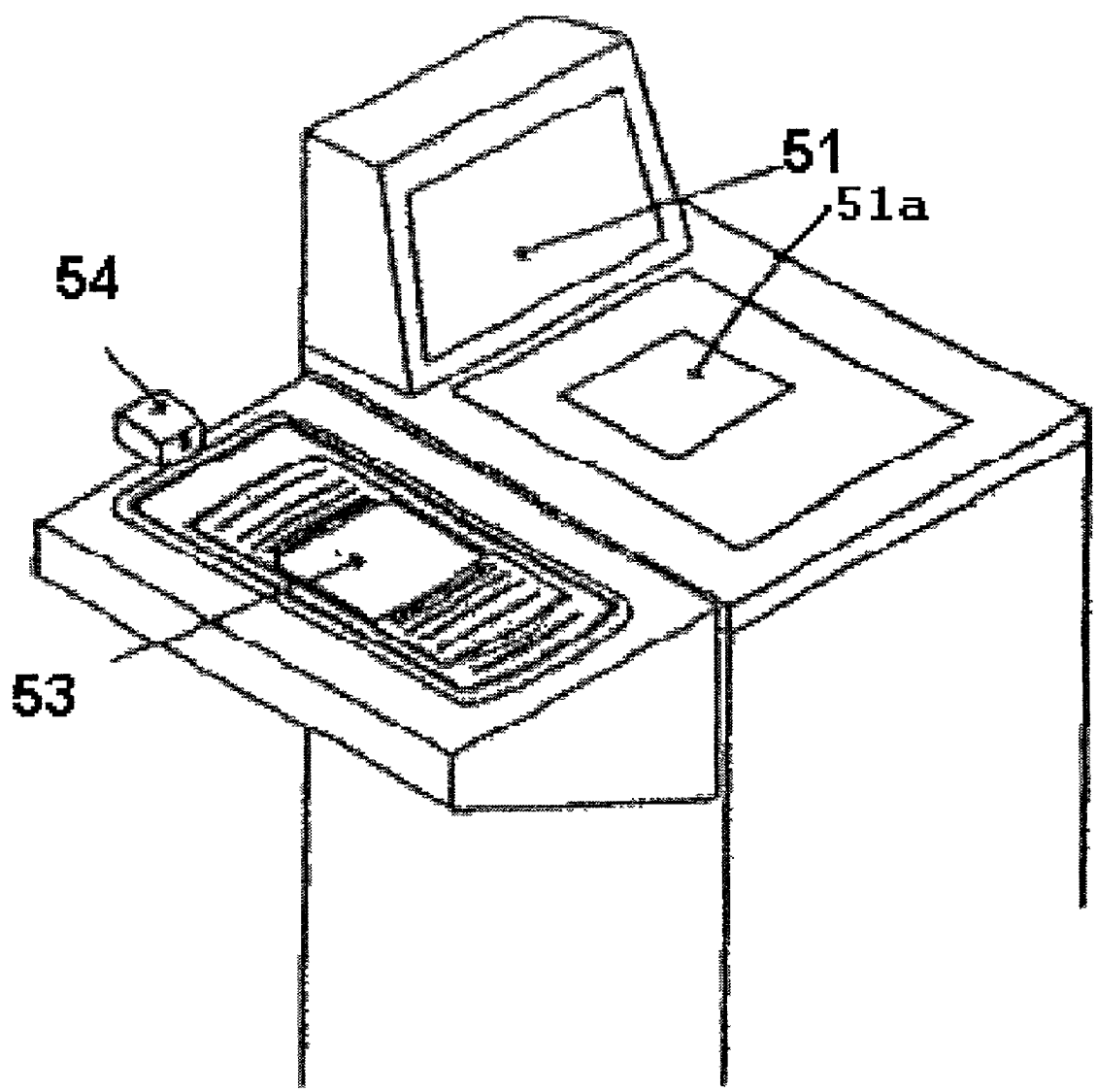
FIG. 1A is a perspective view of a scanner scale assembly having an integrated deactivation pad.

Bar code reader 51 (FIG. 5) may be included as part of an integrated scanner-scale module 51a (FIG. 1A). System 50 of FIG. 5 may further include display 56, speaker 57 and network interface 58. Display 56 may be a touch-screen display which can also be used as an input device.

The computer 55 may be configured similar to known microprocessor-based computers and may include a central processing unit ("CPU"), a plurality of storage devices (such as program memory, random access memory ("RAM"), non-volatile memory or any combination of mass storage devices known conventionally in the art, such as floppy disk, optical disk, hard disk and/or tape cartridge drives, with appropriate device drivers), and an input/output (I/O) interface. A product lookup database, having information relating to items available for purchase may be stored, for example, in the storage devices of computer 55.

Computer 55 can communicate via an I/O interface with bar code reader 51 or other input device such as an integrated scanner-scale 51a (FIG. 1A), integrated bagging scale 52a, deactivation device 53 and sensor 54. The computer 55 can similarly communicate with other devices located at the checkout station such as a display 56 and speaker 57. For example, the computer 55 may be coupled to the deactivation device 53 and sensor 54 in the self-checkout system via RS232 serial communication.

The computer 55 can also communicate via network interface 58 with devices, such as a host system control station and/or a central point-of-sale database, on network 59. Network 59 may be any one or a combination of local area network ("LAN"), wide area network ("WAN"), wireless and other networks. Network interface 58 includes the appropriate hardware and software for interfacing with network 59, including, for example, Ethernet card, modem, radio frequency ("RF") transceiver, etc. For example, computer 55 may download product and other information from a central point-of-sale database over network 59.

Various types of deactivation devices 53, such as the PowerPad® and SlimPad® deactivation pads available from Sensormatic Electronics Corporation, may be used. The particular type of deactivation device used depends on the specific application, such as for use with multimedia items (e.g., video and audio tapes) that are sensitive to magnetic fields. The PowerPad for example, has a multimedia safe mode that enables its use with multimedia items. The particular deactivation device used may not have multimedia safe-mode capabilities or may have some other level or power mode suitable for the particular application.

The size of a deactivation region extending from the deactivation device 53 can be established, or predetermined, to achieve a desired reliability of deactivation. The deactivation region can vary according to the performance and design characteristics of the specific deactivation device used, and the desired deactivation reliability. Accordingly, the volume extending from the particular deactivation device which provides the desired deactivation reliability should be predetermined by measuring the field generated by the deactivation device and/or through trial-and-error testing. Appropriate prompts for deactivating the anti-theft tags can then be provided to a user. For example, through extensive testing it was determined that the PowerPad in multimedia safe mode for instance, has a maximum deactivation range of approximately 3.5 inches to 4 inches away from the pad, and the SlimPad has a maximum deactivation range of 4 inches to 5 inches away, before failure to deactivate an anti-theft tag would occur.

Figure 1B:
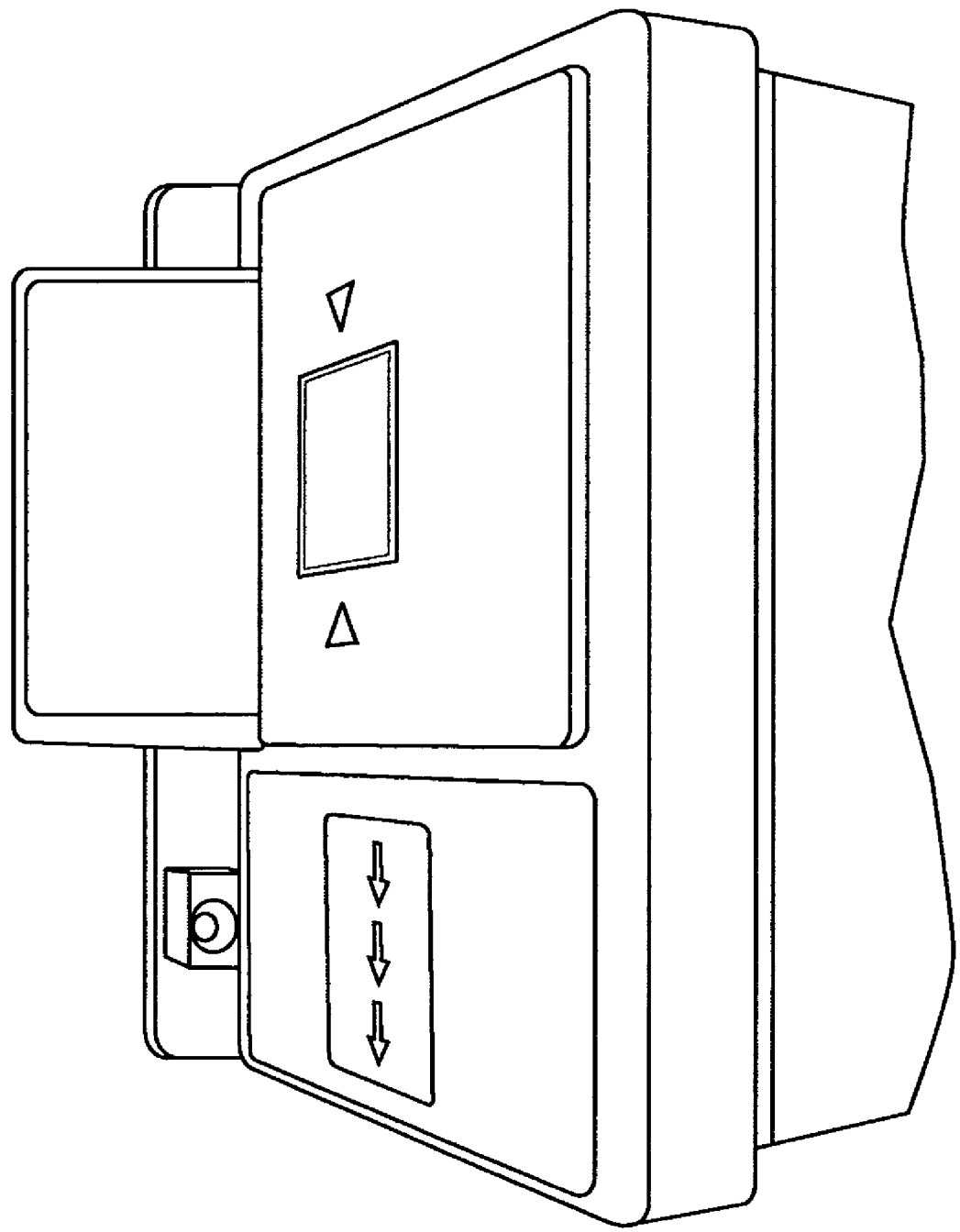
FIG. 1B depicts a scanner scale assembly having an integrated deactivation pad.

The deactivation device 53 may be conveniently located near bar code reader (scanner) 51 (such as, for example, by installing a cantilever bracket to hold the pad in place as shown in FIG. 1A, or by modifying the area of the bar code reader 51 to co-locate the pad 53 and scanner 51 (or scanner-scale 51*a*) in the same module (FIG. 1B)). The deactivation device 53 is positioned between the scanner 51 and the bagging platform 52*b* such that an article for purchase is passed within the deactivation region of the deactivation device 53 on its way from being scanned by bar code scanner 51, to being placed on bagging platform 52*b*.

Upon initiation of activity at the checkout station (such as inputting a product code using a touch-screen provided on display 56, or other input device such as a barcode reader 51, a keypad, or placing an item on scanner-scale 51*a* (FIG. 1)), system 50 (FIG. 5) provides prompts to the user to guide him/her along to successfully process (checkout) each item that the shopper desires to purchase. A combination of visual and/or audible prompts may be provided to the user such as, for example, a graphic user interface (GUI) on display 56 (e.g, FIGS. 2A-2D), on labels or signs visibly located at the checkout station (e.g, FIGS. 1B and 3), or on speaker 57.

Figure 2A:
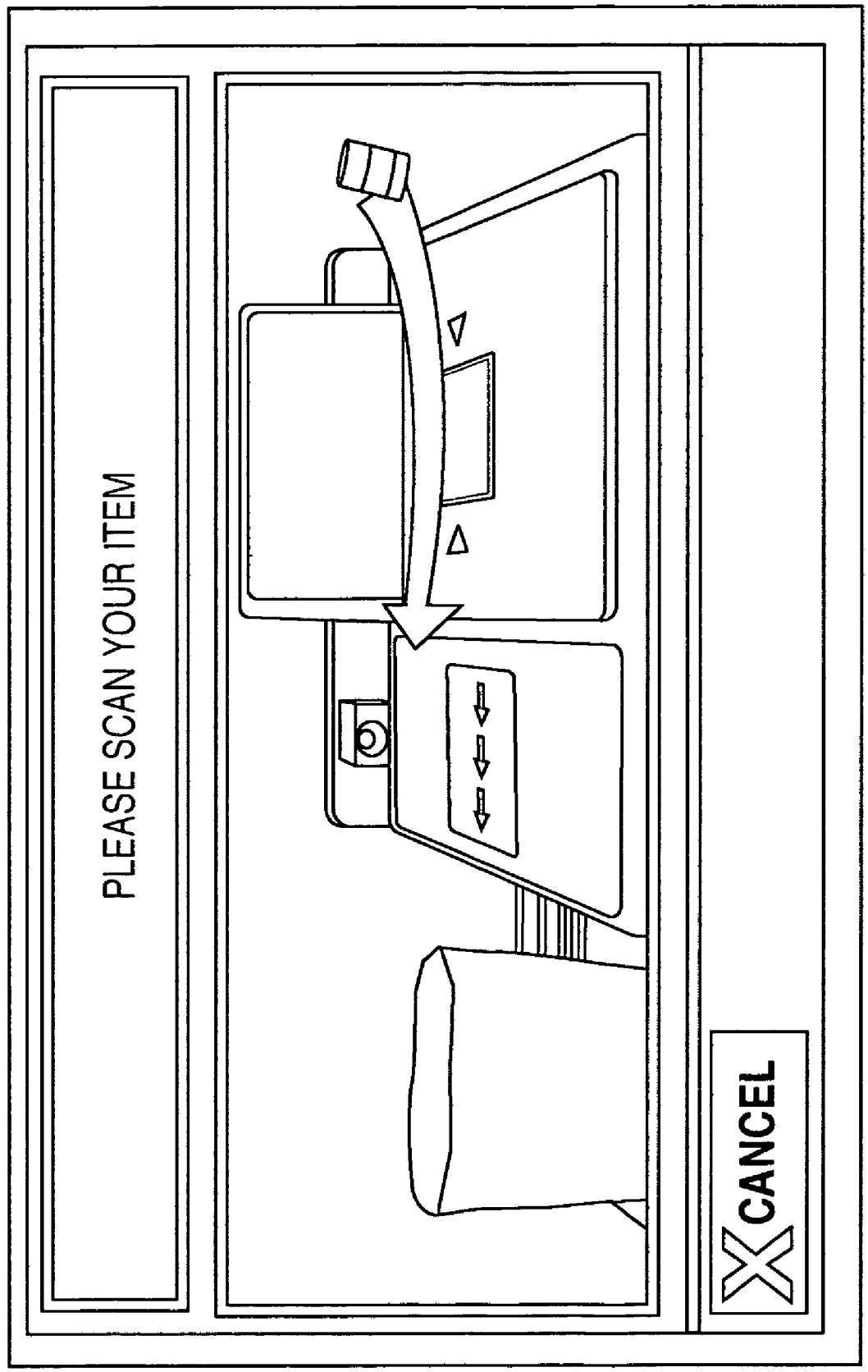
FIG. 2A depicts a prompt guiding a user to scan an item.
Figure 2B:
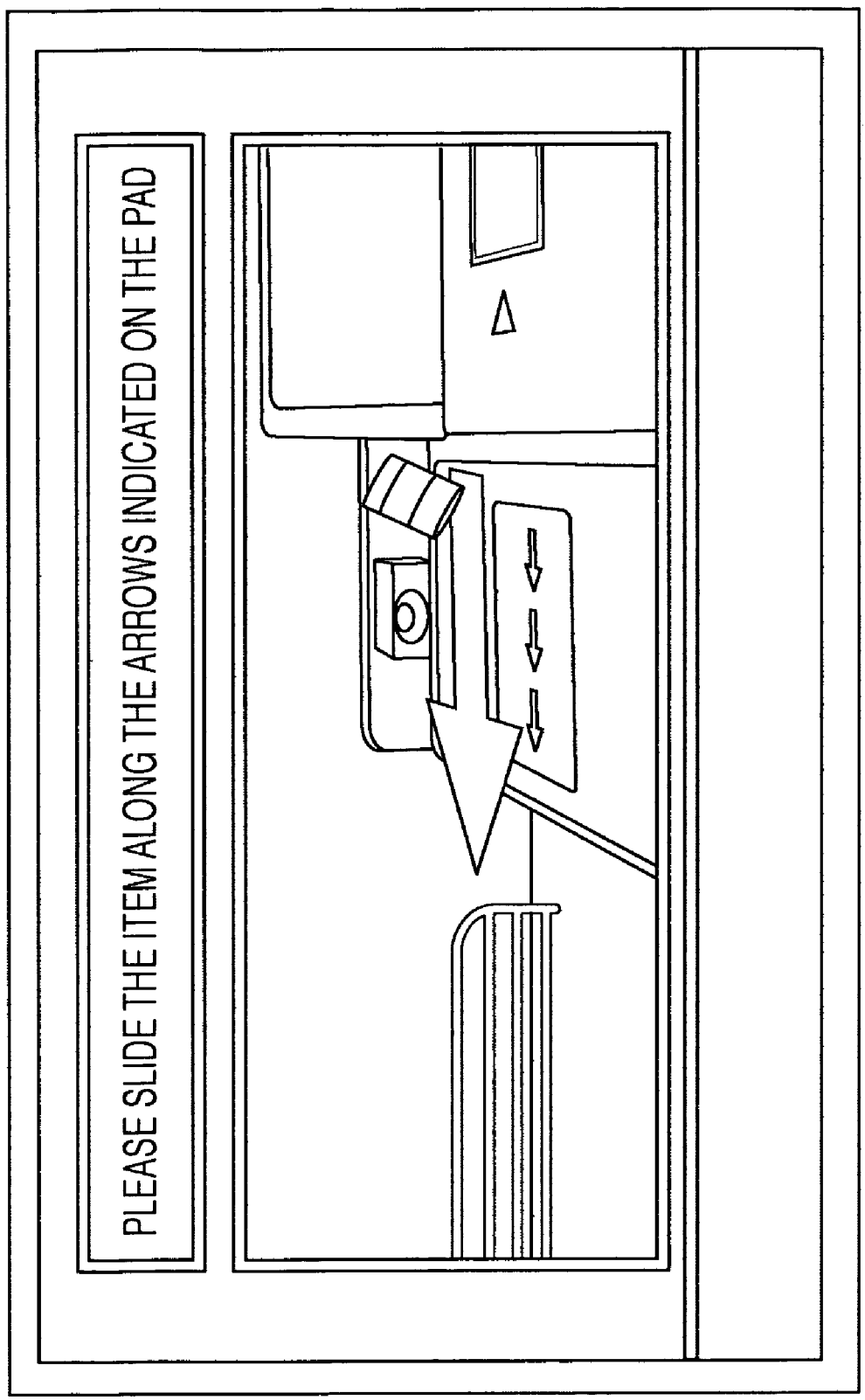
FIG. 2B depicts a prompt guiding a user to pass a scanned item over a deactivation pad.

In one implementation, the system 50 prompts a user to scan an article for purchase (e.g., using a still or animated graphical presentation on display 56, of FIG. 2A), or similar instruction. After system 50 receives a signal from bar code scanner 51 indicating an article was scanned, the system 50 again prompts the user instructing him/her to touch the article (and/or the bar code on the article) to a target (such as a label or sticker) visibly placed within the deactivation region of deactivation device 53. The deactivation target is proximate (i.e., within or adjacent) the deactivation region and positioned to ensure movement of the tag within the deactivation region. A magnetic anti-theft tag is typically affixed to the item within 3 inches of the bar code and in the same plane. Therefore, the bar code on the article may be used as the reference in instructing the user in deactivating a tag on an article. The prompts may be modified according to the specific tagging convention used to achieve the desired deactivation reliability.

Figure 2C:
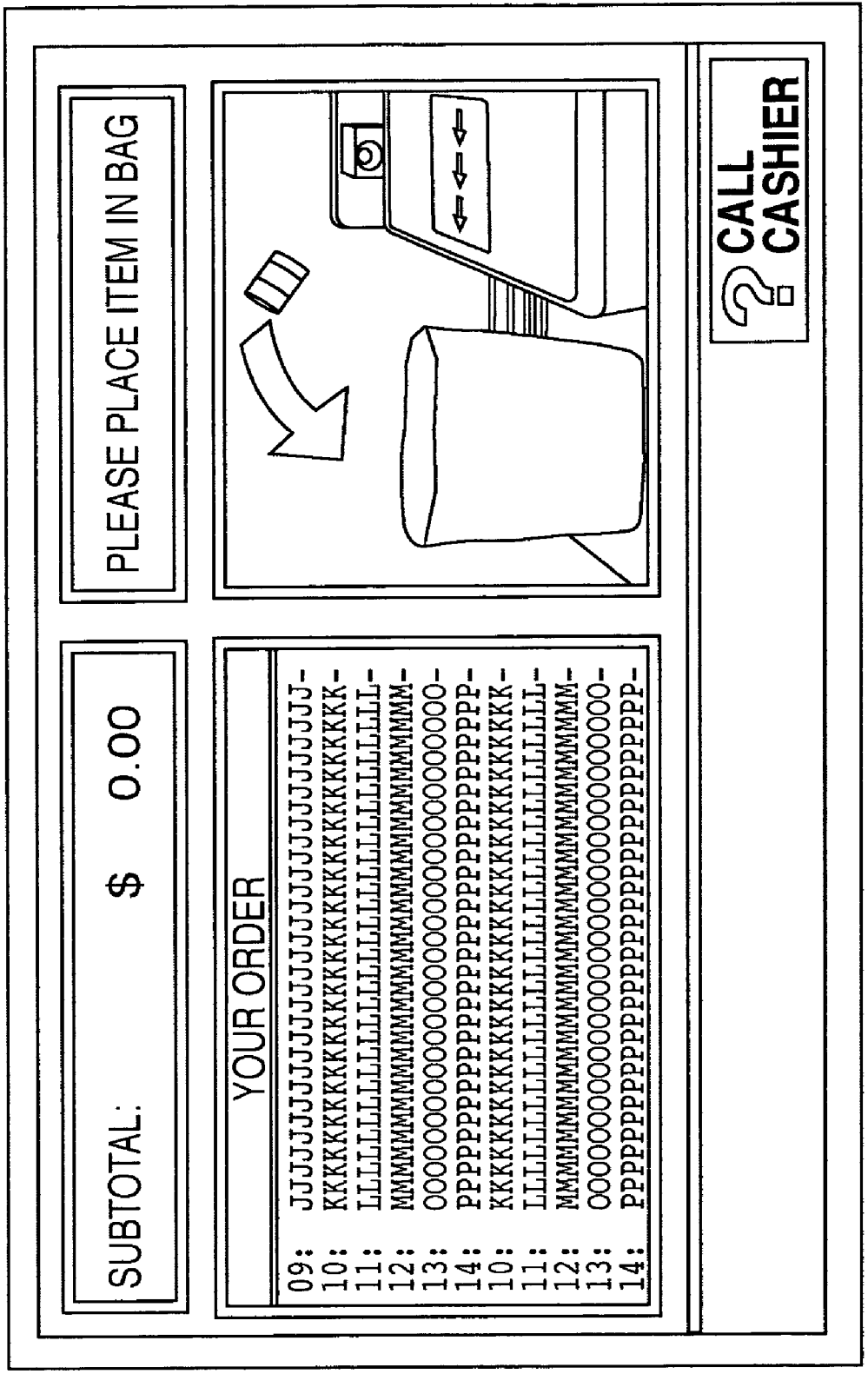
FIG. 2C depicts a prompt guiding a user to place a scanned item in a bag.

In accordance with another implementation, system 50 prompts a user instructing him/her to scan an article for purchase (FIG. 2A). Following scanning of the bar code by reader 51, the user is again prompted, this time to move the article such that it passes within the deactivation region of deactivation pad 53 (FIG. 2B), and then to place the article in a bag on bagging platform 52*b* (FIG. 2C).

Figure 3:
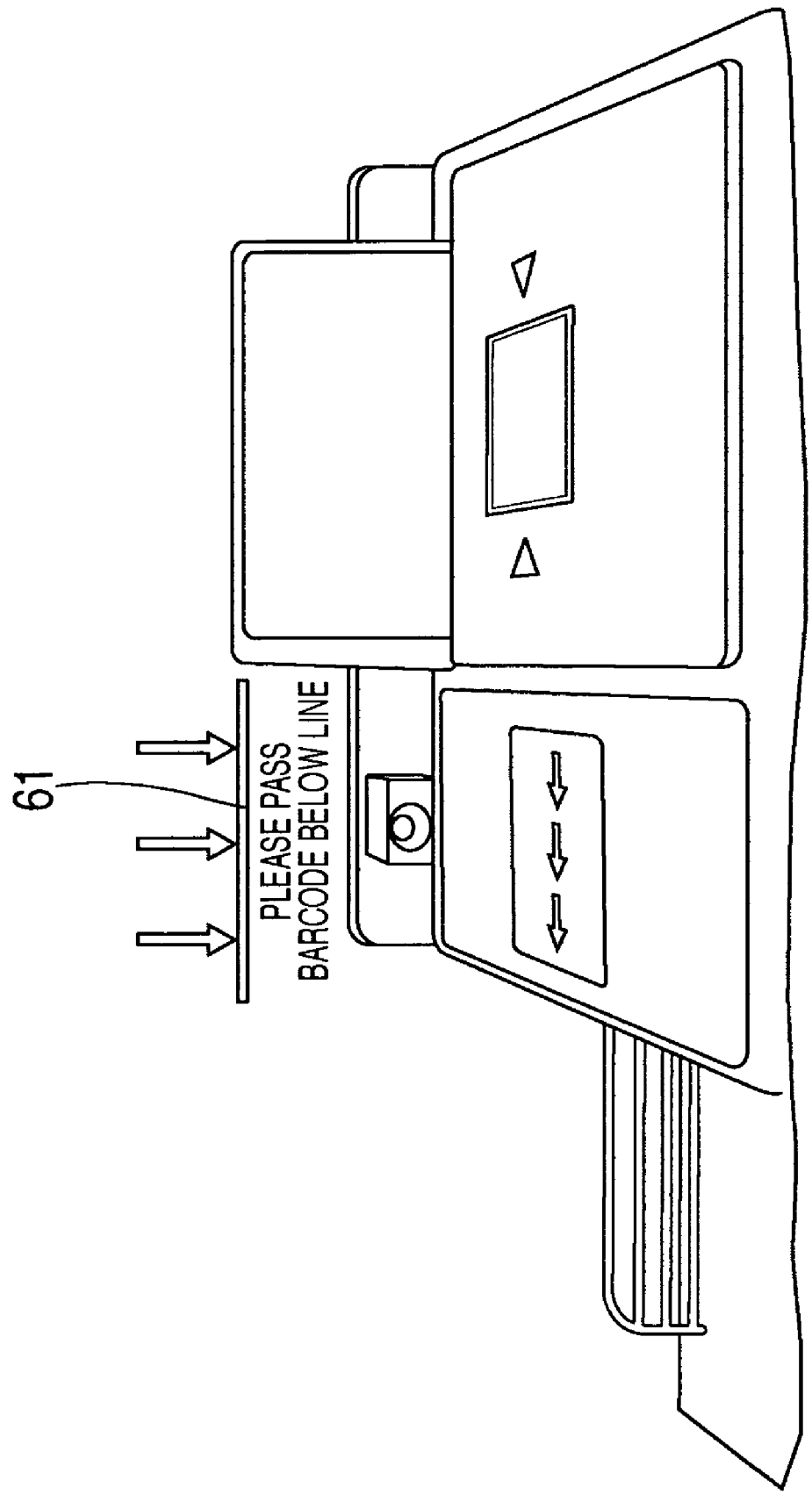
FIG. 3 shows a deactivation pad at a self-checkout station having graphical and textual prompts.

The user may also be prompted graphically. For example, a line with arrows (and/or text next to the line) may be provided on a surface adjacent to the deactivation pad 53 at a predetermined height over the deactivation pad 53, such as, for example 3.5 inches over a PowerPad in multimedia safe mode, to indicate to the user that the bar code of the scanned article should be passed below the line 61, as illustrated in (FIG. 3).

Figure 2D:
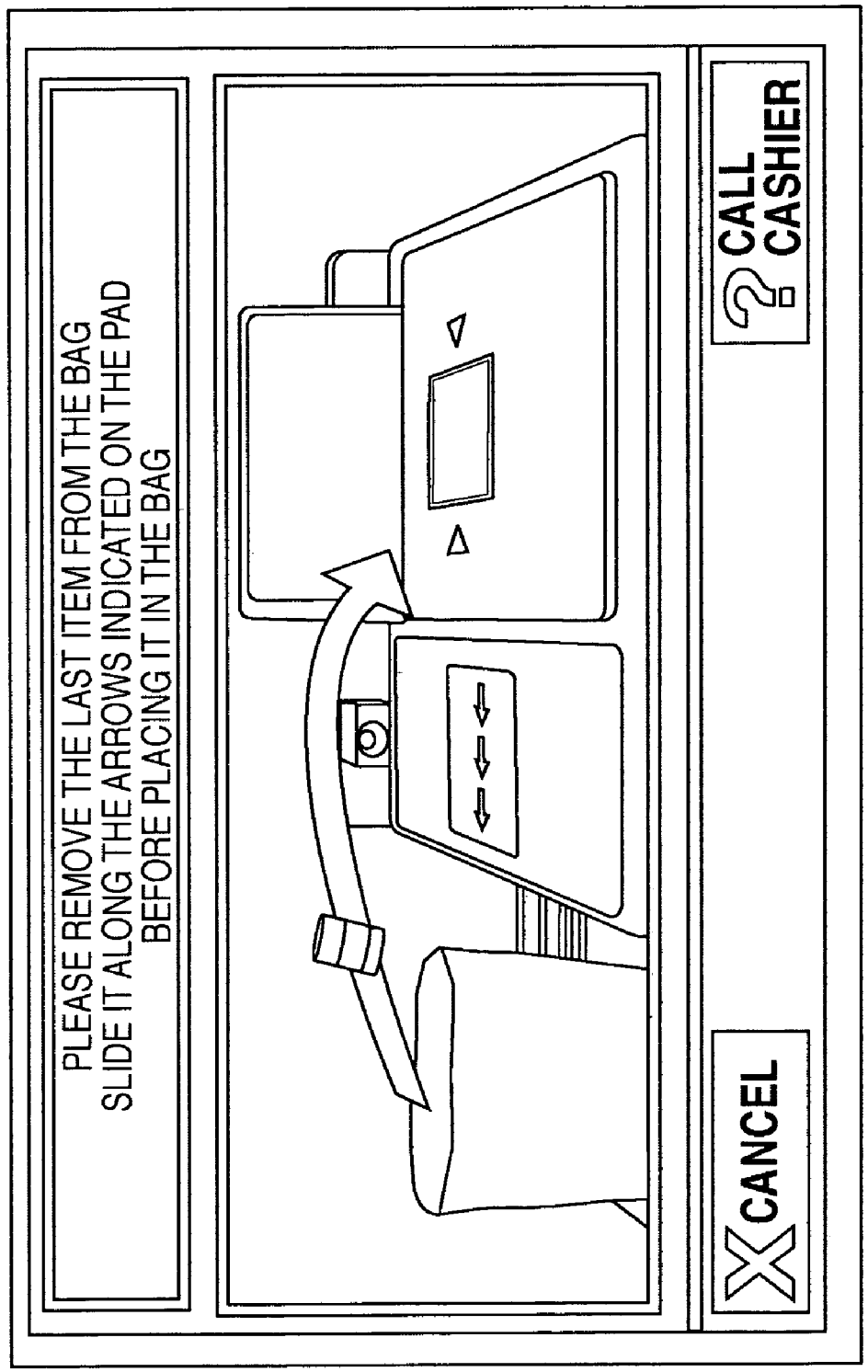
FIG. 2D shows a graphical representation of a prompt guiding a user to remove the last item placed in a bag and pass the item over the deactivation pad again.

Once input is received (e.g., bar code is read), computer 55 monitors bagging scale 52*a* and a sensor 54. By monitoring signals from sensor 54 and bagging scale 52*a*, computer 55 can determine whether the scanned item has been properly passed over the deactivation pad 53 before being placed upon bagging platform 52*b*. If the user passes the article in a manner which fails to cause a signal by sensor 54 prior to bagging scale 52*a* detecting placement of the article upon bagging platform 52*b*, computer 55 causes system 50 to prompt the user again, this time instructing him/her to remove the article from the bag and pass it within the deactivation region of deactivation pad 53 (FIG. 2D).

Sensor 54 (FIG. 5), such as an acoustic or optical sensor, can be positioned and adjusted to monitor (detect) movement of objects within a space or volume, i.e., the predetermined deactivation region of deactivation device 53. When sensor 54 detects movement of an object through the predetermined region, the sensor 54 sends a signal to computer 55. Accordingly, sensor 54 can be used to detect whether the user has correctly moved an article for purchase over the deactivation device 53 (e.g., within the predetermined deactivation region).

Many types of suitable sensors 54 are available. Acoustic sensors establish sound waves that can be adjusted to a specific length and height to create a monitored region. Substantially all objects passing through the sound waves of the monitored region trigger the sensor. Optical sensors which use light beams to create a monitored space may also be used. Compared to acoustic sensors, optical sensors may have increased sensitivity to (i) the surrounding light conditions, (ii) the packaging of the item (e.g., dark vs. light, cellophane vs. foil) and (iii) the size of the item. Thus, care should be taken in selecting and configuring an optical sensor for use in the self-checkout system.

In other implementations, visual and/or aural deactivation feedback may also be provided to the user indicating that the article was successfully passed through the predetermined deactivation region. This feedback may be provided for example, graphically on display 56 or audibly by speaker 57 or by any other visual or audible indicator (such as a light). When the article is passed within the deactivation region, the sensor 54 can detect the movement and activate a signal to computer 55 causing the system to provide an indication (feedback) to the user that the article had been successfully passed through the deactivation region. A visual indication (such as provided by display 56 or a colored light) may indicate when the sensor is triggered by movement of the article through the deactivation region. After receiving a signal from sensor 54 indicating the article passed within the deactivation region and a following signal from bagging scale 52*a* indicating that the item was placed on bagging platform 52*b*, system 50 may prompt the user to proceed with the next item.

Self-checkout system 50 may be configured for use in an environment (such as a retail store) having articles for purchase that have anti-theft tags attached along with items that do not. Upon receiving input relating to an article for purchase (e.g., from bar code reader 51) the system 50 can reference a product lookup database (which contains information relating to each article for sale, identifying those having tags attached) to determine, among other things, whether that particular article has an anti-theft tag attached. If the article is identified as one not having a tag attached, the system can prompt the user to place the item in a bag on bagging platform 52b and ignore signals from sensor 54. Accordingly, the user is not required (prompted) to pass the article within the deactivation region. Once computer 55 receives an indication from bagging scale 52a that the article was placed on platform 52b, system 50 may prompt the user for the next action (such as scanning another item).

Figure 4:
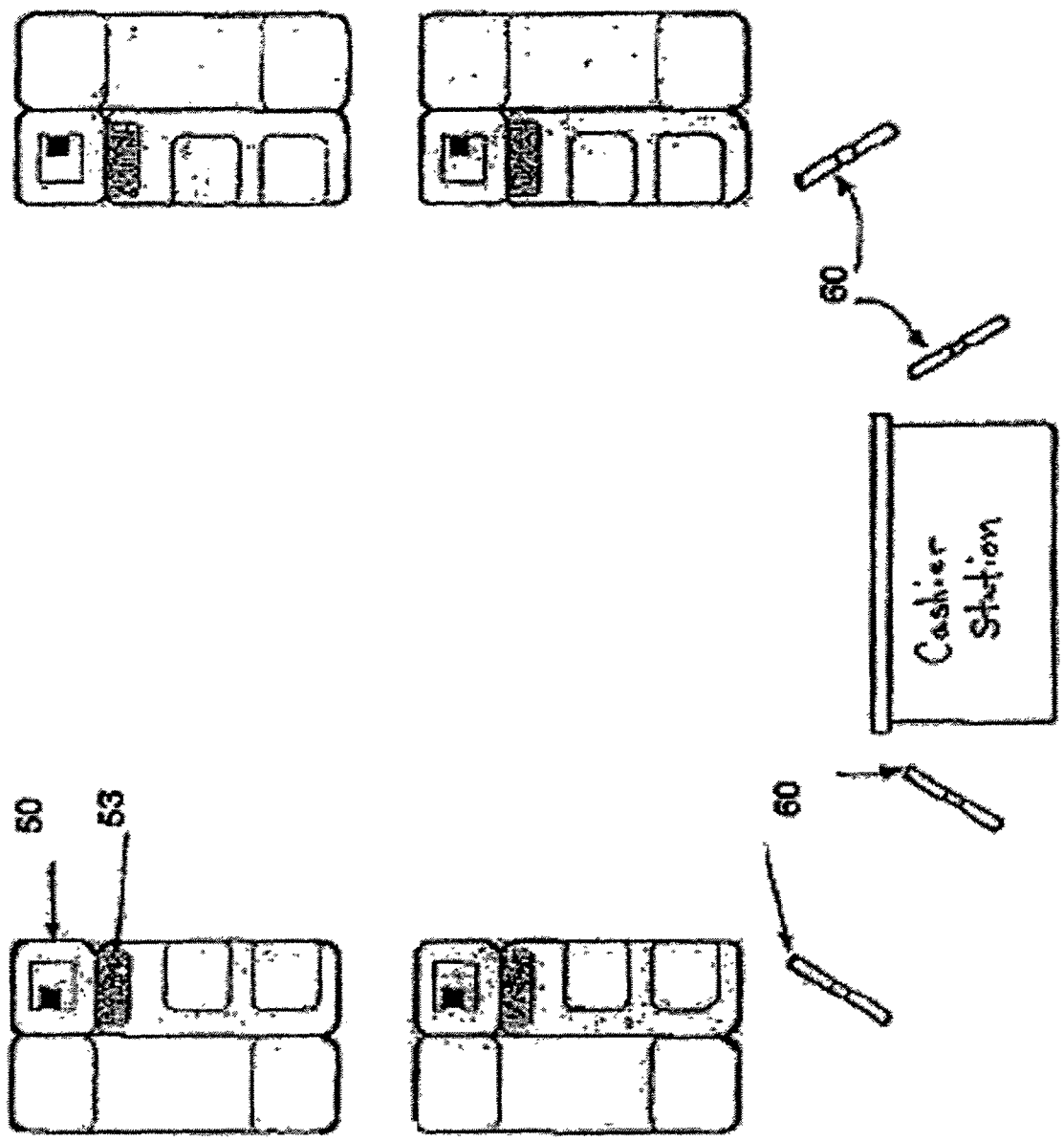
FIG. 4 shows a floor-plan of a checkout area in a self-checkout system.

Further implementations include another known type of security device commonly referred to as "hard tags" (removable hard plastic and/or magnetic security devices). These devices, which must be physically removed from articles for purchase before removing the article from a store, may also be used in combination with detection pedestals 60 (FIG. 4) such as the Ultra.Max pedestals. Self-checkout system 50 may include a device (hard-tag remover) for removing the hard tags from articles following a purchase. Optionally, the hard tag remover may be installed at or near a central cashier's station.

The pedestals 60 may be placed so that an anti-theft tag passing between them is detected. Because customers pass by the pedestals to exit the checkout area, tags that were not deactivated or removed from an article are detected by the pedestals 60 and an audible and/or visual alarm is activated. A store attendant may then deactivate or remove the tags (if appropriate) so that the customer will not trigger additional detectors that are encountered.

A number of embodiments of the present invention have been described. Nevertheless, it will be understood that various changes and modifications of the described embodiments may be made without departing from the spirit or scope of the invention. For example, while the computer in the embodiment described above is microprocessor-based, it may comprise an off-the-shelf personal or workstation-type computer appropriately programmed. Alternatively, the computer may be configured as a controller comprising a combination of discrete components, an ASIC (application specific integrated circuit) with program memory and RAM built-in, and/ or a programmable logic array. Most importantly, the computer/controller should be programmable, in software, hardware or a combination of software and hardware, for monitoring the weights and weight changes on the scales in the system, and storing the weights of food and other items sold in a store. Accordingly, other embodiments are within the scope of the following claims.

What is claimed is:

1. A customer self-checkout system for processing article purchases of articles, the system comprising:
    a self-checkout station comprising:
        an input device configured to receive product code input designating an article for purchase;
        a deactivation device configured to produce a deactivation region effecting deactivation of a security tag attached to the article for purchase;
        a sensor for sensing the presence of the article within the deactivation region;
    a database system coupled to the self-checkout station and comprising stored data identifying articles having attached security tags and articles not having attached security tags;
    a processor configured to receive product code input from the input device and to query the database to determine whether the article designated by said received product code input has an attached security tag;
    a prompting system configured to present a deactivation prompt to direct a user to position the article for purchase within the deactivation region to effect the security tag deactivation, wherein the prompting system is configured to present the deactivation prompt after the receipt of the product code by the input device and prior to deactivation of the article; and wherein
        the prompting system is configured to present the deactivation prompt when the article has an attached security tag and to (i) not present the deactivation prompt and (ii) present a prompt to ignore the deactivation area, when the article does not have an attached security tag.

2. The system of claim 1 wherein the prompting system is configured to present an initial prompt directing a user to enter a product code using the input device.

3. The system of claim 2 further comprising:
    a target visibly disposed proximate the deactivation region at the checkout station; and wherein
    the deactivation prompt instructs the user to move the article to touch the target to effect security tag deactivation.

4. The system of claim 1 wherein the prompting system is further configured to present the deactivation prompt when the stored data associated with the article does not indicate whether said article has an attached security tag or not.

5. The system of claim 1 further comprising:
    a bagging platform comprising a scale operatively coupled to the prompting system and configured to detect weight of bagged articles; and wherein
    the prompting system is configured to present the deactivation prompt when a weight change is detected by the bagging scale and the sensor has not sensed presence of the article within the deactivation region.

6. The system of claim 5 wherein the prompting system is configured to present a bagging prompt providing instructions to a user to place the article into a bag on the bagging platform.

7. The system of claim 5 wherein the bagging platform further comprises a bag holder adapted to hold a bag for receiving the article.

8. The system of claim 1 wherein the prompting system is configured to present a feedback prompt to confirm deactivation of the security tag after the sensor senses presence of the article within the deactivation region.

9. The system of claim 8 wherein the feedback prompt comprises a prompt instructing the user to place the article in a bag.

10. The system of claim 1 wherein the input device comprises a device selected from the group consisting of a bar code scanner, a scanner-scale module, a touch-screen display, and a keypad.

11. The system of claim 1 wherein the deactivation prompt comprises an animated prompt.

12. The system of claim 1, wherein the deactivation prompt is provided by an audio device.

13. A customer self-checkout system for processing article purchases of articles, the system comprising:
    a self-checkout station comprising:
        an input device configured to receive product code input designating an article for purchase;

a deactivation device configured to produce a deactivation region effecting deactivation of a security tag attached to the article for purchase;

a sensor for sensing the presence of the article within the deactivation region;

a target visibly disposed proximate the deactivation region;

a bagging platform comprising a bag holder adapted to hold a bag for receiving the articles and a scale operatively configured to detect weight of the bagged articles;

a database system coupled to the self-checkout station and comprising stored data identifying the articles having attached security tags and articles not having attached security tags;

a processor coupled to the input device, the sensor, the bagging platform and the database, and the processor being configured to receive product code input from the input device and to query the database to determine whether the article designated by received product code input has an attached security tag; and a prompting system configured to present, a prompt directing a user to enter a product code using the input device;

a first deactivation prompt to direct a user to position the article for purchase within the deactivation region to effect the security tag deactivation when a database query determines that the article has an attached security tag, wherein the prompting system is configured to present the deactivation prompt after the receipt of the product code by the input device and prior to deactivation of the article;

a second deactivation prompt when a weight change is detected by the bagging scale and the sensor has not sensed presence of the article within the deactivation region; and a feedback prompt to confirm deactivation of the security tag after the sensor senses presence of an article within the deactivation region, wherein the prompting system is configured to not present the first deactivation prompt, the second deactivation prompt, and the feedback prompt when the database query determines that the article does not have an attached security tag, and, wherein the prompting system is configured to present a prompt to ignore the deactivation area when the database query determines that the article does not have an attached security tag.

* * * * *